United States Patent
Gemoules et al.

(10) Patent No.: US 7,862,176 B2
(45) Date of Patent: Jan. 4, 2011

(54) METHOD OF FITTING RIGID GAS-PERMEABLE CONTACT LENSES FROM HIGH RESOLUTION IMAGING

(75) Inventors: Gregory Gemoules, Coppell, TX (US); Jan Barry Svochak, Hurst, TX (US)

(73) Assignee: TruForm Optics, Euless, TX (US)

( * ) Notice: Subject to any disclaimer, the term of this patent is extended or adjusted under 35 U.S.C. 154(b) by 0 days.

(21) Appl. No.: 12/273,133

(22) Filed: Nov. 18, 2008

(65) Prior Publication Data

US 2010/0123875 A1    May 20, 2010

Related U.S. Application Data (60) Provisional application No. 61/004,129, filed on Nov. 24, 2007.

(51) Int. Cl.
*A61B 3/00* (2006.01)
*A61B 3/10* (2006.01)

(52) U.S. Cl. .................. 351/247; 351/212; 351/219

(58) Field of Classification Search ............... 351/247, 351/212, 219, 205
See application file for complete search history.

(56) References Cited

U.S. PATENT DOCUMENTS

| | | | |
|---|---|---|---|
| 4,966,452 A * | 10/1990 | Shields et al. | 351/219 |
| 6,082,856 A | 7/2000 | Dunn et al. | |
| 6,406,145 B1 | 6/2002 | Jubin | |
| 6,634,753 B1 * | 10/2003 | Rozenman | 351/219 |
| 6,808,262 B2 | 10/2004 | Chapoy et al. | |
| 6,896,368 B2 | 5/2005 | Baugh | |
| 6,902,273 B2 | 6/2005 | Suzaki et al. | |
| 6,988,800 B2 | 1/2006 | Chou et al. | |
| 7,503,655 B2 * | 3/2009 | Smith et al. | 351/246 |

OTHER PUBLICATIONS

Gemoules, "A Novel Method of Fitting Scleral Lenses Using High Resolution Optical Coherence Tomography", Eye & Contact Lens 34(2), 2008, pp. 80-83.

* cited by examiner

*Primary Examiner*—Mohammed Hasan
(74) *Attorney, Agent, or Firm*—Yee & Associates, P.C.

(57) ABSTRACT

A method, computer program product, and data processing system for designing a contact lens. A sagittal image of an anterior portion of an eye having a sclera is measured. Measuring is performed using a digital imaging device. Measuring includes measuring the sclera. A sagittal image is formed. A shape of the eye is derived using the sagittal image, wherein the shape includes the sclera. The shape is converted to a curvature of a contact lens. The curvature is designed such that the contact lens, once manufactured, can be worn over a surface of the eye.

9 Claims, 4 Drawing Sheets

| | Cclear | AECD1 | | | AECD2 | | | AECD3 | | | AECD4 | | | AECD5 | | |
|---|---|---|---|---|---|---|---|---|---|---|---|---|---|---|---|---|
| | 0.000 | 0.050 | | | 0.070 | | | 0.080 | | | 0.030 | | | 0.000 | | |
| O.D. | BC | D1 | S1 | PC1 | D2 | S2 | PC2 | D3 | S3 | PC3 | D4 | S4 | PC4 | D5 | S5 |
| NASAL 0 | 9.07 | 8.0 | 0.980 | 7.87 | 10.0 | 1.700 | 8.29 | 11.0 | 2.120 | 8.47 | 13.0 | 3.080 | 9.78 | 15.0 | 4.080 |
| INFERIOR 90 | 9.53 | 8.0 | 0.930 | 7.73 | 10.0 | 1.670 | 7.51 | 11.0 | 2.170 | 8.69 | 13.0 | 3.080 | 9.78 | 15.0 | 4.080 |
| TEMP 180 | 9.07 | 8.0 | 0.980 | 7.87 | 10.0 | 1.700 | 8.29 | 11.0 | 2.120 | 8.47 | 13.0 | 3.080 | 8.53 | 14.5 | 4.080 |
| SUPERIOR 270 | 9.53 | 8.0 | 0.930 | 7.73 | 10.0 | 1.670 | 7.95 | 11.0 | 2.120 | 8.47 | 13.0 | 3.080 | 9.78 | 15.0 | 4.080 |

METHOD OF FITTING RIGID GAS-PERMEABLE CONTACT LENSES FROM HIGH RESOLUTION IMAGING

The present invention is related to and claims the benefit of priority of provisional U.S. Patent Application Ser. No. 61/004,129 entitled "METHOD OF FITTING RIGID GAS-PERMEABLE CONTACT LENSES FROM HIGH RESOLUTION IMAGING," filed on Nov. 24, 2007, which is hereby incorporated by reference.

BACKGROUND OF THE INVENTION

1. Field of the Invention

The present invention relates generally to designing and manufacturing contact lens eyewear and more specifically to a method for fitting contact lenses from high resolution imaging.

2. Description of the Related Art

Some patients require contact lenses shaped such that the edge of the contact lens rests on the sclera of the eye. The sclera is the whitish fibrous membrane (known as albuginea) that with the cornea forms the outer covering of the eyeball. Contact lenses having an edge that rests on the sclera are called corneascleral lenses or scleral lenses. However, historically, scleral contact lenses are difficult to fit. Patients that need scleral contact lenses often have irregularly-shaped eyes, making the fitting of a contact lens a time consuming and expensive process.

Past methods of fitting different kinds of contact lenses include keratometric measurements to measure the eye, empirical methods using trial lenses, or corneal videokeratography (topography). While these methods may be sufficient for simple lens designs, distinct disadvantages are inherent with more complex lenses, such as scleral or corneascleral lenses. These current methods are unable to measure accurately out to the scleral region of the eye.

For example, keratometric measurements reflect only the central three millimeters of the cornea. Thus, keratometric measurements produce insufficient data for producing scleral contact lenses. In another example, videokeratography relies upon derivation of the corneal shape from a series of rings projected onto the eye. However both this method and keratometric measurements are only approximations of the true shape of the cornea. Furthermore, neither method measures outside of the cornea onto the sclera.

Therefore, the area beyond the cornea must be estimated based on trial lens fittings using lenses of known curvatures and sizes using a method of bracketing the fit. The method of fitting using trial lenses is a long and laborious process, and can be very expensive if the lenses are difficult to manufacture, as is the case with scleral lenses. Additionally, arriving at a precise fit can require many weeks or months using many different trial lenses. During this time the patient is deprived of the desired or needed contact lens.

BRIEF SUMMARY OF THE INVENTION

The illustrative embodiments provide for a method, computer program product, and data processing system for designing a contact lens. A sagittal image of an anterior portion of an eye having a sclera is measured. Measuring is performed using a digital imaging device. Measuring includes measuring the sclera. A sagittal image is formed. A shape of the eye is derived using the sagittal image, wherein the shape includes the sclera. The shape is converted to a curvature of a contact lens. The curvature is designed such that the contact lens, once manufactured, can be worn over a surface of the eye.

DETAILED DESCRIPTION OF THE INVENTION

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including, but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
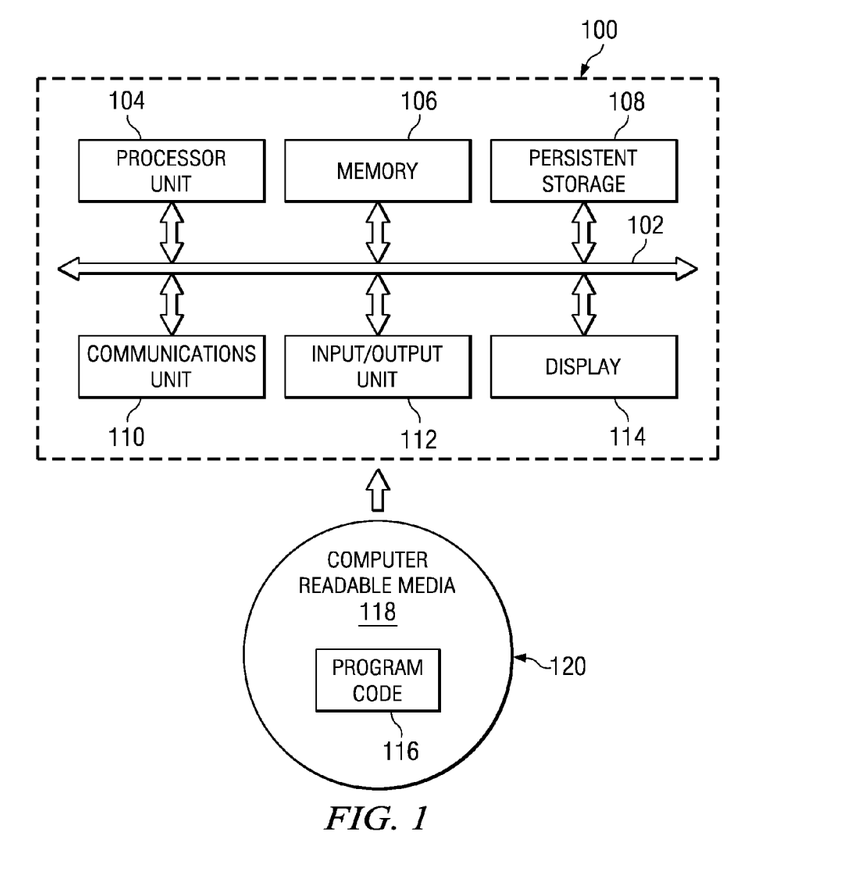
FIG. 1 is a diagram of a data processing system, in accordance with an illustrative embodiment.

Turning now to FIG. 1, a diagram of a data processing system is depicted in accordance with an illustrative embodiment. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices. A storage device is any piece of hardware that is capable of storing information either on a temporary basis and/or a permanent basis. Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard and mouse. Further, input/output unit 112 may send output to a printer. Display 114 provides a mechanism to display information to a user.

Instructions for the operating system and applications or programs are located on persistent storage 108. These instructions may be loaded into memory 106 for execution by processor unit 104. The processes of the different embodiments may be performed by processor unit 104 using computer implemented instructions, which may be located in a memory, such as memory 106. These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 116 is located in a functional form on computer readable media 118 that is selectively removable and may be loaded onto or transferred to data processing system 100 for execution by processor unit 104. Program code 116 and computer readable media 118 form computer program product 120 in these examples. In one example, computer readable media 118 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 118 also may take the form of a persistent storage, such as a hard drive, a thumb drive, or a flash memory that is connected to data processing system 100. The tangible form of computer readable media 118 is also referred to as computer recordable storage media. In some instances, computer readable media 118 may not be removable.

Alternatively, program code 116 may be transferred to data processing system 100 from computer readable media 118 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

In some illustrative embodiments, program code 116 may be downloaded over a network to persistent storage 108 from another device or data processing system for use within data processing system 100. For instance, program code stored in a computer readable storage medium in a server data processing system may be downloaded over a network from the server to data processing system 100. The data processing system providing program code 116 may be a server computer, a client computer, or some other device capable of storing and transmitting program code 116.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 100 is any hardware apparatus that may store data. Memory 106, persistent storage 108 and computer readable media 118 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

Figure 2:
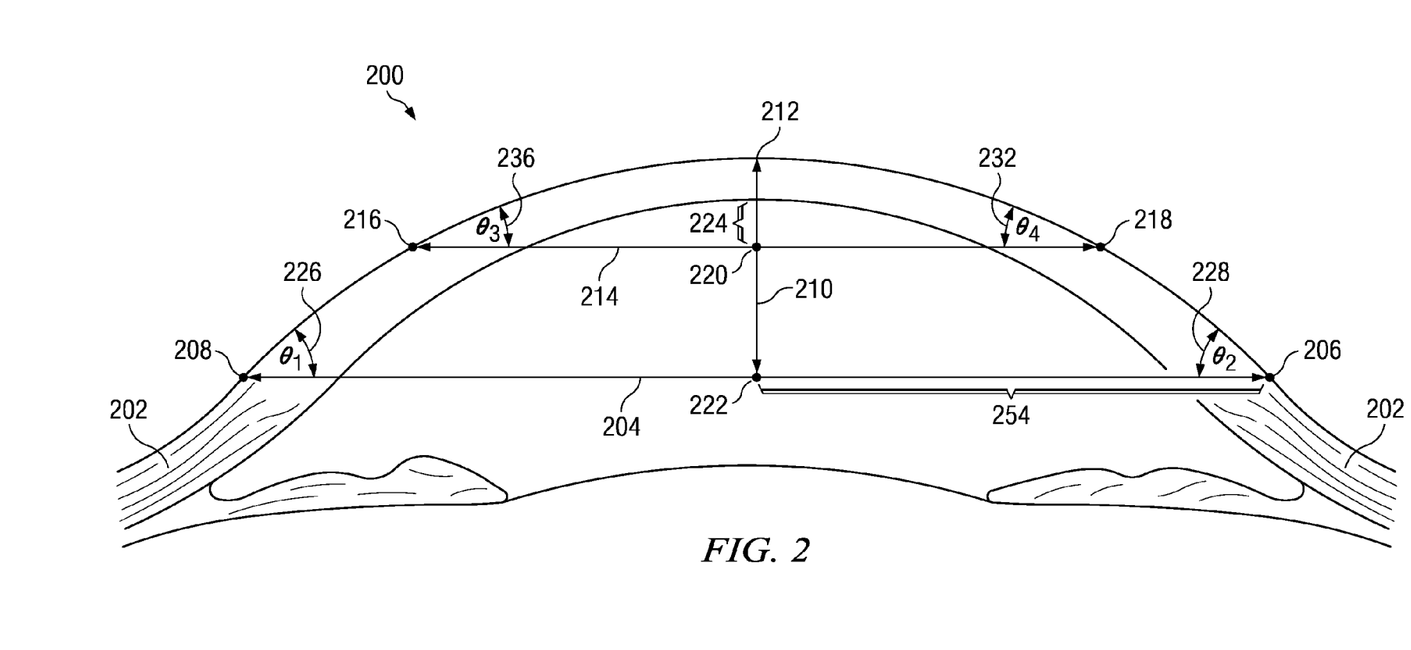
FIG. 2 is a cross section image of an eye, in accordance with an illustrative embodiment.

FIG. 2 is a cross section image of an eye, in accordance with an illustrative embodiment. Cross section image 200 is a sagittal image of an anterior portion of an eye having sclera 202. Cross section image 200 can be measured using a digital imaging device connected to a computer, such as data processing system 100. Examples of digital imaging devices include an ultrasound device, an optical coherence tomography device, and a Scheimpflug camera system, and other devices useful for measuring an eye. The illustrative embodiments are not limited to the specific technique used to produce cross section image 200. Nevertheless, the illustrative embodiments use such devices to derive the shape of the eye for the purposes of contact lens fitting. In particular, a shape of the eye is derived using the sagittal image, wherein the shape includes the sclera. The shape is converted to a curvature of a contact lens. The curvature is designed such that the contact lens, once manufactured, can be worn over a surface of the eye.

The shape of the eye can be derived from cross section image 200 using different methods. In one illustrative embodiment, a first line, or chord 204 is drawn at first point 206 on the surface of the eye to second point 208 on the surface of the eye. Second point 208 is opposite the first point relative to cross section image 200.

Sagittal line 210 is then drawn from chord 204 to apex 212. Sagittal line 210 can be considered a second line from the chord 204 to apex 212 of the cornea of the eye. As can be seen, sagittal line 210 is perpendicular to chord 204. The distances of these lines are then measured. From these distances a curvature of the eye at first point 206 and second point 208 can be determined.

In this illustrative embodiment, apex 212 is located at the center of the cornea of the eye. However, apex 212 can be located at any point along the cornea of the eye and is not limited to the center.

Mathematically, a radius of curvature of the eye at first point 206 and second point 208 is defined by a formula defined by $z=y^2/[r_0+\sqrt{(r_o^2-py^2)}]$, wherein z is the length of sagittal line 210 (the second line), y is a length of chord 204 (first chord) divided by two, $r_0$ is the radius of curvature of the eye at first point 206 and second point 208, and p is a first asphericity of the eye at the first point 206 and second point 208. The shape of the eye can be characterized by the radius of curvature (which can be characterized as a first radius of curvature).

Additionally, multiple chords can be drawn parallel to chord 204 and perpendicular to sagittal line 210. At each chord, a different curvature of the eye at the corresponding two points can be determined. In this way, many different curvatures of the eye can be determined at multiple cross sections of the eye. These different curvatures can be combined to determine an overall shape of the eye. The more chords are measured, and the closer the chords are together, the more accurate the derived shape of the eye.

Thus, for example, the above method of deriving a shape of the eye can include drawing third line 214 from third point 216 on the surface of the eye to fourth point 218 on the surface of the eye, wherein third point 216 is opposite fourth point 218 relative to the image, and wherein third line 214 comprises a second chord, and wherein the second chord intersects second line 210 at fifth point 220, which is different than sixth point 222 of the intersection of first chord 204 and second line 210. A second radius of curvature of the eye at third point 216 and fourth point 218 is defined by a second mathematical formula defined by $z_1=y_1^2/[r_1+\sqrt{(r_1^2-p_1y_1^2)}]$, wherein $z_1$ comprises third length 224 of second line 210 measured between apex 212 and fifth point 222, $y_1$ comprises a fourth length of second chord 214 divided by two, $r_1$ is the second radius of curvature, and $p_1$ is a second asphericity of the eye at third point 216 and fourth point 218. The shape of the eye is derived by combining the first radius of curvature and the second radius of curvature.

In an illustrative embodiment, the first chord comprises a first meridian and the second chord comprises a second meridian. In this case, measuring the eye further includes identifying a principle meridian of the eye and scanning the eye at the principle meridian to determine a third radius of curvature of the eye at the principle meridian. Scanning can be performed using corneal topography. The shape of the eye can be further derived using both the first radius of curvature and the third radius of curvature.

In an illustrative embodiment, the shape of the eye can also be determined using angles measured between corresponding chords and corresponding lines tangential to the eye at corresponding points of intersection of the chords at the edge of the eye. Still further, the shape of the eye can be further refined by combining a shape derived using these angles and a shape derived using the techniques described above with respect to sagittal line 210. For example, angle $\theta_1$ 226 is the angle between chord 204 and a line tangential to the eye at second point 208. Similarly, $\theta_2$ 228 is the angle between chord 204 and a line tangential to the eye at first point 206. Likewise, $\theta_3$ 236 is the angle between chord 214 and a line tangential to the eye at third point 216 and $\theta_4$ 232 is the angle between chord 214 and a line tangential to the eye at fourth point 218. Using these angles, a shape of the eye can be determined using a method of best fit spheres.

The process of determining the shape of the eye can be improved through the use of edge detection software. Specifically, the process described above with respect to FIG. 2 can be automated using edge detection software. Use of edge detection software is a faster method to measure the sagittal depth at specified points. Additionally, edge detection software can be used with respect to more complex shapes than the arcs shown in FIG. 2. An "arc," as used in this application, is a chord section, such as chord section 254. An example of a more complex arc would be a chord section that is drawn, with respect to sagittal line 210 at an angle other than ninety degrees.

The illustrative embodiments can be still further enhanced with the use of a digital library stored on any convenient storage device. The digital library contains measurements of one or more eyes that were measured with respect to the techniques described herein. Preferably, the digital library contains the measurements of many different eyes. The digital library can then be used to create fitting sets of contact lenses, or to create template designs for contact lenses. These template designs or fitting sets are useful in the case where someone who fits contact lenses, such as an optometrist, does not want to invest money in the machinery required to perform the techniques described herein, but still wants to benefit from the techniques described herein.

In an illustrative embodiment, the measured eyes are categorized according to some scheme, such as by operation or by patient condition. For example, measured eyes could be characterized according, but not limited to post-lasik, post-radial keratometry, post-corneal transplant, keratoconus, and others. Template designs can then be formed from these measured, categorized eyes.

Alternatively, using the digital library, the contact lens fitter can use some other method to measure a patient's eye and then compare that measurement of a patient's eye to measured eyes in the digital library. The contact lens fitter then selects a measured eye from the library that most closely fits the measurement of the patient's eye, and then order trial contact lenses based on the measurements of the eye in the digital library. The contact lens fitter could further modify these measurements before ordering the first set of trial contact lenses.

In both cases, either using a generalized template made according to a particular condition or procedure or by performing some other less accurate measurement, a contact lens fitter can still use a trial-and-error fitting technique. However, the speed and cost effectiveness of the older process of fitting contact lenses is improved, particularly for scleral contact lenses.

Figure 3:
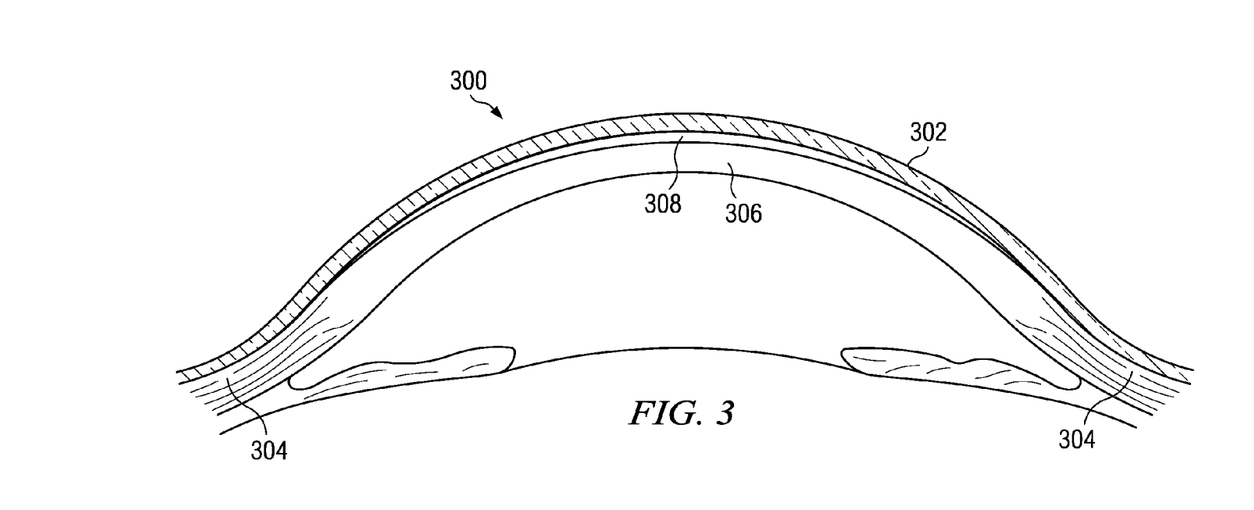
FIG. 3 is a cross section image of an eye fitted with a contact lens according to the methods and devices described herein, in accordance with an illustrative embodiment.

FIG. 3 is a cross section image of an eye fitted with a contact lens according to the methods and devices described herein, in accordance with an illustrative embodiment. Cross section image 300 is the same as cross section image 200 of FIG. 2; however, contact lens 302 has been placed over the eye. Contact lens 302 rests on sclera 304, and is thus a scleral contact lens. Contact lens 302 also has a shape such that contact lens 302 rises above cornea 306. In other words, contact lens 302 does not contact cornea 306, as shown by space 308. However, the illustrative embodiments are not limited to the manufacture of scleral contact lenses. The techniques described above can also be used to create custom contact lenses of any kind.

Contact lens 302 is designed and then manufactured using the shape of the eye derived from the measurements taken of cross section image 200 of FIG. 2. In an illustrative embodiment, a contact lens manufacturer modifies the derived shape of the eye to achieve the shape of contact lens 302. For example, the derived shape of the eye is modified so that a uniform space (space 308) is present between the contact lens 302 and the cornea of the eye, even though the eye shape is irregular and even though the edges of contact lens 302 rests on sclera 304. The shape of the contact lens is further modified to have prescribed optical properties so that the patient is better able to see when the patient is wearing contact lens 302.

Actual manufacture of these contact lenses can be accomplished using a number of different techniques. In one example, a computer-driven lathe is used to grind a contact lens to have the calculated shape. Software can be used to control the lathe. Other methods can also be used to create contact lens 302.

The illustrative embodiments have been implemented with respect to actual patients during experimental use. During the experimental use, nine patients were fitted with contact lenses designed and manufactured according to the techniques described with respect to FIG. 2 and FIG. 3. The patients reported good results in terms of comfort, acuity, and wearing time. Five patients only needed one set of lenses. Four patients required two or more sets of lenses. The average number of attempts to fit contact lenses was 1.7 per patient.

This number is substantially and unexpectedly less than the number of attempts usually reported to fit this type of scleral contact lens. For example, one reputable provider reports an average of 3.5 to 10 attempts per eye over a period of up to six months. See, for example, bostonsight.org/doctors.htm.

In addition, the contact lenses designed according to the techniques described with respect to FIG. 2 and FIG. 3 generally demonstrate superior performance relative to contact lenses manufactured by a trial and error iterative process. Three case studies are presented below to show the improved performance of the inventive techniques of the illustrative embodiments.

Case 1. Bilateral Radial Keratotomy (RK)

The first patient was a 66-year-old man who had undergone bilateral 16 incision RK with 4 t-cuts in 1993. He complained of fluctuating vision and poor acuity. His manifest refraction was +4.00 −3.00×135 in the OD and +2.75 −1.00×80 in the OS. His best corrected visual acuities were 20/30 in the OD and 20/25 in the OS. Trial lens fitting was initially attempted. The first set of lenses vaulted the corneas excessively, creating large central air bubble formation. The second set of lenses fit excessively flat, and showed excessive central bearing and edge lift, where the edge of the contact lens lifted away from the sclera.

After these two unsuccessful attempts at fitting using trial lenses, scans were obtained with the OCT device and converted into sag measurements. This process resulted in a pair of fenestrated lenses exhibiting minimal central vaulting, no bubble formation, and ideal alignment out into the sclera. Visual acuities were 20/25 in the OD and 20/20 in the OS. A mild nuclear cataract was present in the right eye. The patient reported no lens awareness. Interestingly, the higher-order aberration root mean square was reduced by 85%, coma was reduced by 63%, and spherical aberration was reduced by 95% with the contact lenses.

Case 2. Bilateral Laser In Situ Keratomileusis With Large Pupils

The second case is a 37-year-old man who underwent bilateral laser in situ keratomileusis 8 months prior. The patient's chief complaint was severe low-light glare as a result of large pupils. He had tried topical brimonidine to induce miosis, but without consistent results. The method of fitting using trial lenses was not attempted, and sagittal measurements were obtained from high resolution optical coherence tomography and sent directly to the lab. The initial set of lenses exhibited light central touch and nice scleral alignment. Additionally, the right lens exhibited minimal vertical translation with the blink. Another set of lenses was ordered in a larger diameter to improve central corneal clearance and minimize lens translation with blinking. Those goals were realized, except that the right lens exhibited 1 D of flexure. By taking two scans 90 degrees apart, it was discovered that this patient's peripheral cornea and scleral also exhibited about 1 D of toricity that did not show up on corneal topography. The right lens center thickness was subsequently increased. The best corrected visual acuity improved from 20/30 in both eyes to 20/20 OD and 20/20 OS with the lenses. The total higher-order aberrations improved by 89%, coma improved by 94%, and spherical aberration improved by 98% with the lenses on.

Case 3. High Corneal Astigmatism and Corneal Atopy

The third case was a 45-year-old woman who developed a severe atopic keratitis and was unable to wear conventional contact lenses. Her left eye was highly toric, with more than 4 D of corneal astigmatism. Many attempts had previously been made to fit the left eye with a scleral lens without success, the chief problem being excessive air bubble formation from excessive corneal clearance. After redesigning the left lens into a bitoric using the sagittal measuring techniques described with respect to FIG. 2 and FIG. 3 (obtained using high resolution optical coherence tomography), there was no bubble formation and a minimal amount of corneal clearance was present. The right eye presented fewer problems with fitting, and also exhibited more corneal epithelial verticillata. After several weeks of wearing the scleral lens in the right eye, marked improvement in the epithelial irregularity was observed.

Figure 4:
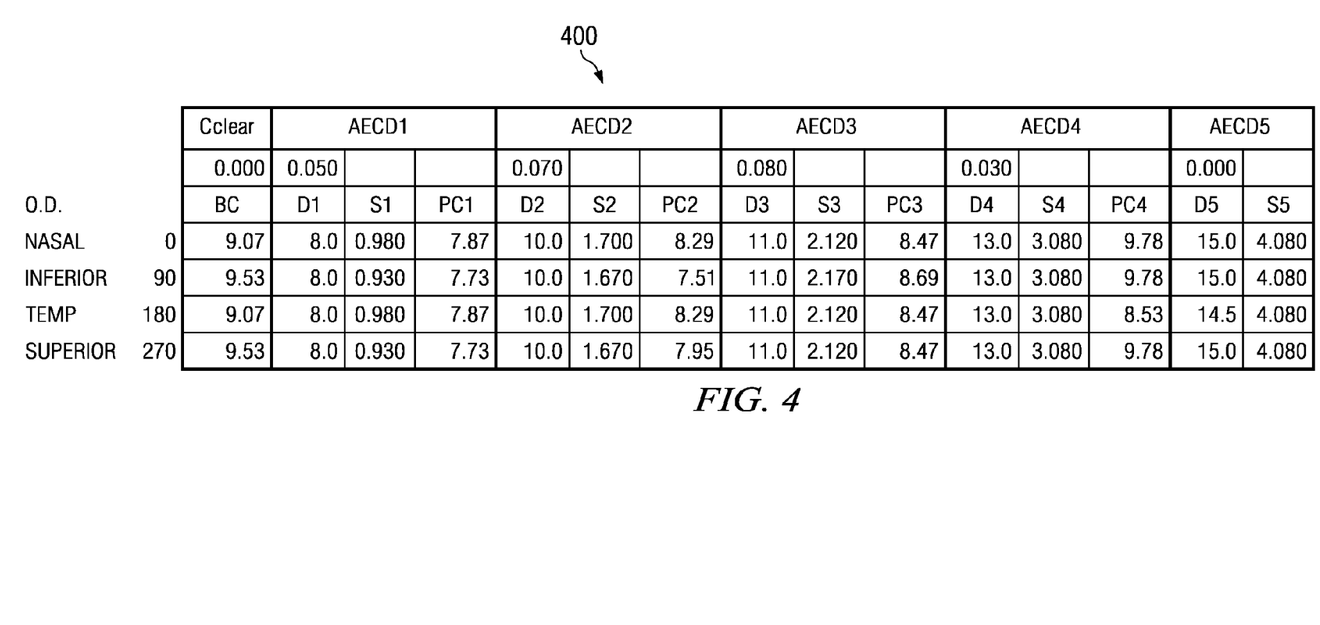
FIG. 4 is a table of data usable to form a contact lens, wherein the table of data is generated using a high resolution measuring technique, in accordance with an illustrative embodiment.

FIG. 4 is a data structure usable to form a contact lens, wherein the data structure is generated using a high resolution measuring technique, in accordance with an illustrative embodiment. Data structure 400 can be implemented as, but not limited to a table of data, a flat file, an array, or a database. Data structure 400 represents actual data taken of an eye using high resolution optical coherence tomography according to the techniques described with respect to FIG. 2 and FIG. 3. This data can be used to create a contact lens, such as contact lens 302. Data structure 400 can be stored in a memory of a data processing system, such as memory 106 of FIG. 1, and subsequently processed using a data processing system, such as data processing system 100 of FIG. 1.

Data structure 400 can contain data for the central clearance (Cclear). The central clearance is the distance between the eye and the center of the lens. Data structure 400 can also contain data for one or more axial clearances (AECD). There can be a different axial clearance for each measured diameter (D). For example, AECD1 can be the axial clearance at diameter 1 (D1). Each axial clearance can contain any number of measurements including sagittal depth (S) and the peripheral curve (PC) at the measured diameter for the axial clearance.

Data structure 400 can contain different sections of sagittal measurements. Each section is a half of a sagittal profile. The different sections can be, but are not limited to the NASAL, INFERIOR, TEMPORAL, SUPERIOR, and others. A combination of the sagittal measurements and clearance amounts can be used to calculate radii for the different sections. In this illustrative embodiment, each section is defined by two planes intersecting to form a 90 degree angle. For example, the INFERIOR section would be at a 90 degree angle to the NASAL section. Thereafter, the TEMPORAL section would be at a 90 degree angle to the INFERIOR section and so on. In this illustrative embodiment, four sections are used (two sagittal profiles split in half). However, any number of sagittal sections can be used. In this illustrative embodiment the shape factor (p) equals 1 and the eccentricity value (e) equals 0. These two values are related in the mathematical formula $p=1-e^2$.

Figure 5:
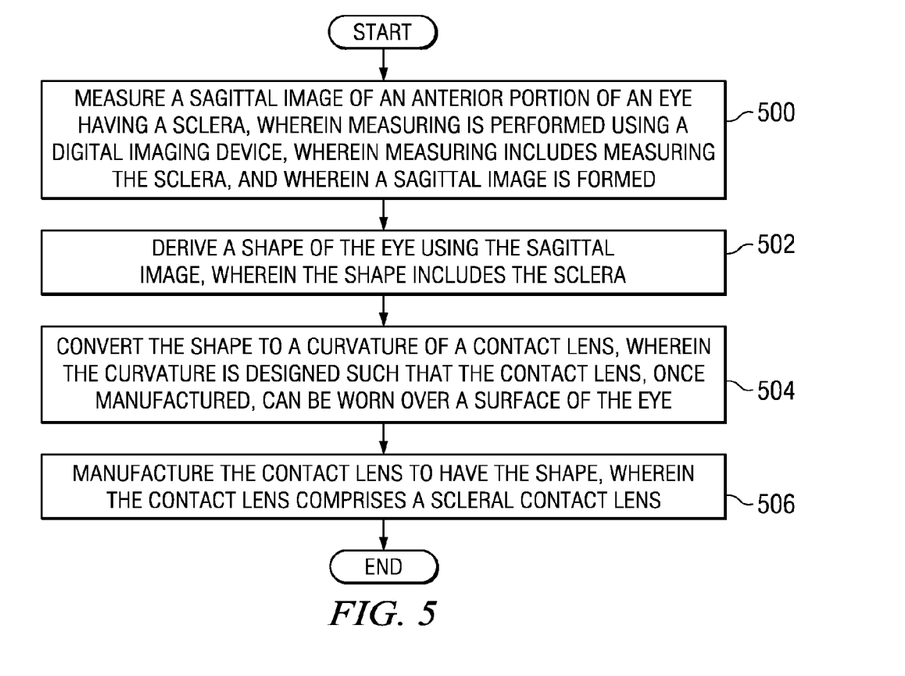
FIG. 5 is a flowchart of a process for manufacturing a contact lens, in accordance with an illustrative embodiment.

FIG. 5 is a flowchart of a process for manufacturing a contact lens, in accordance with an illustrative embodiment. The process described in FIG. 5 can be implemented using software acting on the data, such as the data in table of data 400 of FIG. 4, to drive a computer-driven lathe to manufacture a contact lens. Such data can be generated according to the techniques described with respect to FIG. 2 and FIG. 3. The computer can be any data processing system, such as data processing system 100 of FIG. 1. Together, the eye measuring tool, the software, the data, and the computer form a system that implements the process. The result of this process is a contact lens manufactured according to the techniques described with respect to FIG. 2 and FIG. 3, such as contact lens 302 of FIG. 3.

The process begins as the system measures a sagittal image of an anterior portion of an eye having a sclera, wherein measuring is performed using a digital imaging device, wherein measuring includes measuring the sclera, and wherein a sagittal image is formed (step 500). In an illustrative embodiment, the digital imaging device is selected from the group consisting of an ultrasound device, an optical coherence tomography device, and a Scheimpflug camera system. The system then derives a shape of the eye using the sagittal image, wherein the shape includes the sclera (step 502). The system converts the shape to a curvature of a contact lens, wherein the curvature is designed such that the contact lens, once manufactured, can be worn over a surface of the eye (step 504). Finally, the system manufactures the contact lens to have the shape, wherein the contact lens comprises a scleral contact lens (step 506).

Although the illustrative embodiments have been described with respect to manufacturing scleral contact lenses, the illustrative embodiments are not limited to this type of contact lens. The illustrative embodiments can be used to create any kind of custom contact lens.

In another illustrative embodiment, the described method includes drawing a first line at a first point on the surface of the eye to a second point on the surface of the eye, wherein the second point is opposite the first point relative to the image, and wherein the first line comprises a first chord. A second line is drawn from the first chord to an apex of a cornea of the eye, wherein the second line is perpendicular to the first chord. A first radius of curvature of the eye at the first point and the second point is defined by a first mathematical formula defined by $z=y^2/[r0+\sqrt{(ro^2-py^2)}]$, wherein z comprises a first length of the second line, y comprises a second length of the first chord divided by two, r0 is the first radius of curvature, and p is a first asphericity of the eye at the first point and the second point. Deriving the shape includes using the first radius of curvature.

In another illustrative embodiment, measuring further comprises drawing a third line from a third point on the surface of the eye to a fourth point on the surface of the eye, wherein the third point is opposite the fourth point relative to the image, and wherein the third line comprises a second chord, and wherein the second chord intersects the second line at a fifth point different than a sixth point of intersection of the first chord and the second line. A second radius of curvature of the eye at the third point and the fourth point is defined by a second mathematical formula defined by $z1=y1^2/[r1+\sqrt{(r1^2-p1y1^2)}]$, wherein z1 comprises a third length of the second line measured between the apex and the fifth point, y1 comprises a fourth length of the second chord divided by two, r1 is the second radius of curvature, and p1 is a second asphericity of the eye at the third point and the fourth point. Deriving the shape is performed by combining the first radius of curvature and the second radius of curvature.

In still another illustrative embodiment, the first chord comprises a first meridian and the second chord comprises a second meridian. In this case, measuring further includes identifying a principle meridian of the eye, scanning the eye at the principle meridian to determine a third radius of curvature of the eye at the principle meridian, and deriving the shape includes using both the first radius of curvature and the third radius of curvature. Scanning can be performed using corneal topography.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of designing a contact lens comprising:
   measuring a sagittal image of an anterior portion of an eye having a sclera and a cornea, wherein measuring is performed using a digital imaging device, wherein measuring includes measuring the sclera and an apex of the cornea of the eye, and wherein the sagittal image is formed;
   deriving a shape of the eye using the sagittal image, wherein the shape includes the sclera and the apex of the cornea of the eye; and
   converting the shape to a curvature of a contact lens, wherein the curvature is designed such that the contact lens, once manufactured, can be worn over a surface of the eye.

2. A method of designing a contact lens comprising:
   measuring a sagittal image of an anterior portion of an eye having a sclera and a cornea, wherein measuring is performed using a digital imaging device, wherein measuring includes measuring the sclera and an apex of the cornea of the eye, and wherein the sagittal image is formed, wherein measuring a sagittal image of an anterior portion of an eye having a sclera and a cornea further comprises:
  drawing a first line at a first point on the surface of the eye to a second point on the surface of the eye, wherein the second point is opposite the first point relative to the image, and wherein the first line comprises a first chord; and
  drawing a second line from the first chord to an apex of a cornea of the eye, wherein the second line is perpendicular to the first chord, wherein a first radius of curvature of the eye at the first point and the second point is defined by a first mathematical formula defined by $z=y^2/[r_0+\sqrt{(r_o^2-py^2)}]$, wherein z comprises a first length of the second line, y comprises a second length of the first chord divided by two, $r_0$ is the first radius of curvature, and p is a first asphericity of the eye at the first point and the second point;
deriving a shape of the eye using the first radius of curvature, wherein the shape includes the sclera and the apex of the cornea of the eye; and
converting the shape to a curvature of a contact lens, wherein the curvature is designed such that the contact lens, once manufactured, can be worn over a surface of the eye.

3. The method of claim 2 wherein:
measuring further comprises:
  drawing a third line from a third point on the surface of the eye to a fourth point on the surface of the eye, wherein the third point is opposite the fourth point relative to the image, and wherein the third line comprises a second chord, and wherein the second chord intersects the second line at a fifth point different than a sixth point of intersection of the first chord and the second line;
a second radius of curvature of the eye at the third point and the fourth point is defined by a second mathematical formula defined by $z_1=y_1^2/[r_1+\sqrt{(r_1^2-p_1y_1^2)}]$, wherein $z_1$ comprises a third length of the second line measured between the apex and the fifth point, $y_1$ comprises a fourth length of the second chord divided by two, $r_1$ is the second radius of curvature, and $p_1$ is a second asphericity of the eye at the third point and the fourth point; and
deriving the shape is performed by combining the first radius of curvature and the second radius of curvature.

4. The method of claim 1 wherein the digital imaging device is selected from the group consisting of an ultrasound device, an optical coherence tomography device, and a Scheimpflug camera system.

5. The method of claim 1 further comprising:
manufacturing the contact lens to have the shape, wherein the contact lens comprises a scleral contact lens.

6. The method of claim 2, wherein the first chord comprises a first meridian and the second chord comprises a second meridian, and wherein measuring further comprises:
  identifying a principle meridian of the eye;
  scanning the eye at the principle meridian to determine a third radius of curvature of the eye at the principle meridian; and
  deriving the shape includes using both the first radius of curvature and the third radius of curvature.

7. The method of claim 6 wherein scanning is performed using corneal topography.

8. The method of claim 1 further comprising:
  storing the shape of the eye in a digital library comprising measurements of a plurality of eyes, wherein the measurements are categorized into categories;
  categorizing the shape into a category in the categories and storing the shape in the category; and
  manufacturing a template contact lens based on a combination of measurements of the measured eyes in the category.

9. A method of designing a contact lens comprising:
  measuring a sagittal image of an anterior portion of an eye having a sclera and a cornea, wherein measuring is performed using a digital imaging device, wherein measuring includes measuring the sclera and an apex of the cornea of the eye, and wherein the sagittal image is formed, wherein measuring a sagittal image of an anterior portion of an eye having a sclera and a cornea further comprises:
  measuring an angle between a first line and a tangential line, wherein the first line comprises a chord that extends between a first point that is opposite a second point on the eye, wherein the first line is further perpendicular to a sagittal line extending from an apex of the eye to the chord, wherein the tangential line comprises a line tangential to the first point with respect to a second shape of the eye at the first point, and wherein deriving comprises using the angle to derive the shape of the eye;
  deriving a shape of the eye using the sagittal image, wherein the shape includes the sclera and the apex of the cornea of the eye; and
  converting the shape to a curvature of a contact lens, wherein the curvature is designed such that the contact lens, once manufactured, can be worn over a surface of the eye.

* * * * *

UNITED STATES PATENT AND TRADEMARK OFFICE
CERTIFICATE OF CORRECTION

| | | |
|---|---|---|
| PATENT NO. | : 7,862,176 B2 | Page 1 of 1 |
| APPLICATION NO. | : 12/273133 | |
| DATED | : January 4, 2011 | |
| INVENTOR(S) | : Gregory Gemoules and Jan Barry Svochak | |

It is certified that error appears in the above-identified patent and that said Letters Patent is hereby corrected as shown below:

Title Page;
Page 1, Item (73): Assignee: TruForm Optics, Euless, TX (US) should be removed. No assignment was filed with respect to the patent.

Signed and Sealed this
Seventh Day of June, 2011

David J. Kappos
*Director of the United States Patent and Trademark Office*